US008769108B2

(12) United States Patent
Meylemans et al.

(10) Patent No.: US 8,769,108 B2
(45) Date of Patent: Jul. 1, 2014

(54) PEER-TO-PEER NEGOTIATION IN A WIRELESS NETWORK

(75) Inventors: Marc Meylemans, Beaverton, OR (US); Emily H. Qi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 562 days.

(21) Appl. No.: 12/456,961

(22) Filed: Jun. 24, 2009

(65) Prior Publication Data

US 2010/0332662 A1 Dec. 30, 2010

(51) Int. Cl.
*G06F 15/16* (2006.01)

(52) U.S. Cl.
USPC .......................................... 709/227; 709/220

(58) Field of Classification Search
None
See application file for complete search history.

(56) References Cited

U.S. PATENT DOCUMENTS

| 7,061,895 | B1 | 6/2006 | Habetha |
| 7,869,413 | B2* | 1/2011 | Zuniga ........................... 370/338 |
| 8,244,249 | B1* | 8/2012 | Everson et al. ............... 455/436 |
| 2005/0201301 | A1* | 9/2005 | Bridgelall ..................... 370/254 |
| 2005/0262216 | A1 | 11/2005 | Kashiwabara et al. |
| 2006/0142034 | A1* | 6/2006 | Wentink et al. ............... 455/515 |
| 2006/0215673 | A1 | 9/2006 | Olvera-Hernandez |
| 2008/0069021 | A1* | 3/2008 | Chhabra ....................... 370/311 |
| 2009/0034432 | A1* | 2/2009 | Bonta et al. .................. 370/255 |
| 2010/0057943 | A1* | 3/2010 | Petricoin, Jr. ................. 710/10 |
| 2010/0198952 | A1* | 8/2010 | Kneckt et al. ................ 709/223 |

FOREIGN PATENT DOCUMENTS

| JP | 2001186213 | 12/1999 |
| WO | 2005/046137 A1 | 5/2005 |
| WO | 2005048504 | 5/2005 |
| WO | 2011/005348 A1 | 1/2011 |

OTHER PUBLICATIONS

Kapil Sood, U.S. Patent Appl. No. 12/384,522, filed Apr. 6, 2009 entitled "Direct Peer Link Establishment in Wireless Networks".
Emily H. Qi, U.S. Appl. No. 12/386,761, filed Apr. 22, 2009 entitled "Discovery Channel and Discovery Beacon for Peer-To-Peer Devices in Wireless Communications Network".
International Search Report and Written Opinion received for PCT Patent Application No. PCT/US2010/032260, mailed on Dec. 7, 2010, 8 pages.
Office Action received for Chinese Patent Application No. 201010220331.8, mailed Nov. 5, 2012, 6 pages including 3 pages English translation.
Office Action received for Japanese Patent Application No. 2012-517518, mailed Jun. 25, 2013, 6 pages including 3 pages English translation.

* cited by examiner

*Primary Examiner* — Ario Etienne
*Assistant Examiner* — Clayton R Williams
(74) *Attorney, Agent, or Firm* — Kacvinsky Daisak Bluni PLLC

(57) ABSTRACT

When two wireless communication devices discover each other and prepare to associate with each other, they perform a negotiation with each other to decide which will act as the network controller in that association. The negotiation may include an exchange of information indicating which device is more suitable to act as a network controller.

22 Claims, 4 Drawing Sheets

PEER-TO-PEER NEGOTIATION IN A WIRELESS NETWORK

BACKGROUND

In an ad-hoc wireless communications network, all the devices in the network may come and go, and therefore no single device is designated as the permanent network controller. However, to feasibly maintain scheduled communications in the network, some device needs to be designated as the current network controller. In conventional networks, the first device to start transmitting beacons becomes the network controller, and invites the subsequent devices to join its network. However, this process may not result in the best choice for a network controller. A network controller generally needs to have greater processing capacity and greater communications bandwidth than the other devices in the network. Since the network controller may also need to remain in an operational state rather than periodically sleeping in a low power mode, it is generally better if it is powered from an AC power source rather than a battery. Choosing a network controller based simply on which device transmits beacons first does not take any of these factors into consideration, and may result in a poor choice for network controller.

BRIEF DESCRIPTION OF THE DRAWINGS

Some embodiments of the invention may be understood by referring to the following description and accompanying drawings that are used to illustrate embodiments of the invention. In the drawings.

DETAILED DESCRIPTION

Figure 1:
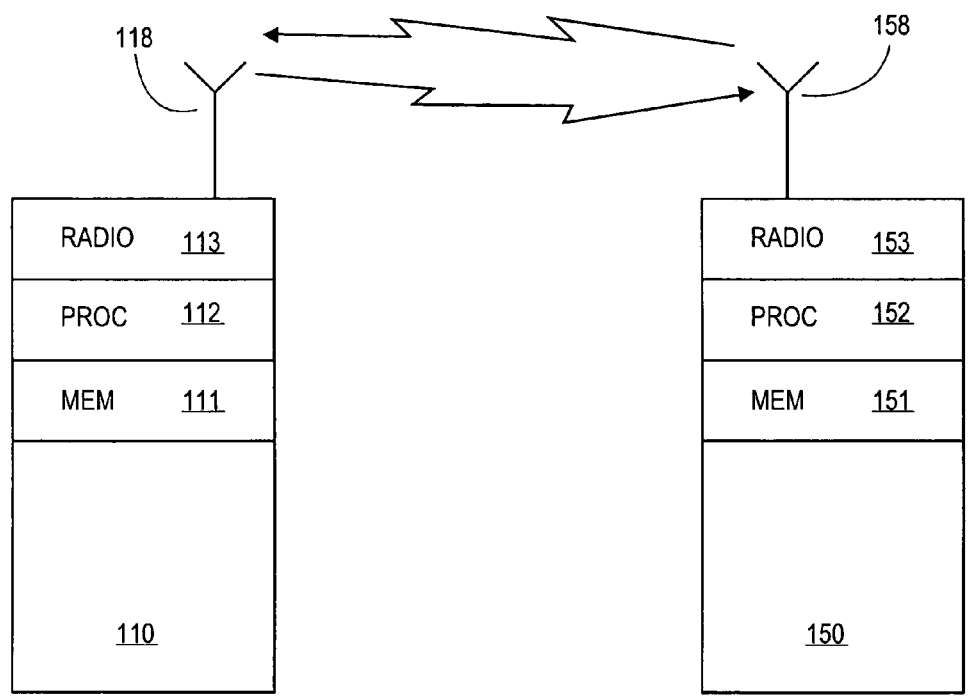
FIG. 1 shows two wireless communication devices, according to an embodiment of the invention.

In the following description, numerous specific details are set forth. However, it is understood that embodiments of the invention may be practiced without these specific details. In other instances, well-known circuits, structures and techniques have not been shown in detail in order not to obscure an understanding of this description.

References to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the following description and claims, the terms "coupled" and "connected," along with their derivatives, may be used. It should be understood that these terms are not intended as synonyms for each other. Rather, in particular embodiments, "connected" is used to indicate that two or more elements are in direct physical or electrical contact with each other. "Coupled" is used to indicate that two or more elements co-operate or interact with each other, but they may or may not be in direct physical or electrical contact.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

Various embodiments of the invention may be implemented in one or any combination of hardware, firmware, and software. The invention may also be implemented as instructions contained in or on a computer-readable medium, which may be read and executed by one or more processors to enable performance of the operations described herein. A computer-readable medium may include any mechanism for storing information in a form readable by one or more computers. For example, a computer-readable medium may include a tangible storage medium, such as but not limited to read only memory (ROM); random access memory (RAM); magnetic disk storage media; optical storage media; a flash memory device, etc.

The term "wireless" may be used to describe circuits, devices, systems, methods, techniques, communications channels, etc., that communicate data by using modulated electromagnetic radiation through a non-solid medium. The term does not imply that the associated devices do not contain any wires, although in some embodiments they might not. A wireless device may comprise at least one antenna, at least one radio, and at least one processor, where the radio transmits signals through the antenna that represent data and receives signals through the antenna that represent data, while the processor may process the data to be transmitted and the data that has been received. The processor may also process other data, which is neither transmitted nor received.

The term "network controller" (NC) is used herein to describe a wireless communications device that schedules wireless communications with other devices associated with it in the network. The term "subscriber station" (SS) is used herein to describe a wireless communications device that is associated with the NC, and whose communications with the NC are largely scheduled by the NC. The term "associated" indicates that the SS has provided sufficient information about itself that the NC is aware of the existence of the SS, and the NC and SS have agreed on enough protocols that they can communicate with each other. Other terms may be used to describe NC's, such as but not limited to "access point", "base station", "control point" (CP), etc. Other terms may be used to describe SS's, such as but not limited to mobile station (MS), STA, DEV, etc. The terms used in this document are intended to encompass all such alternative labels for these functional devices.

In various embodiments, two wireless devices may negotiate with each other to decide which will be the network controller and which will be the subscriber station in their subsequent communications. The decision in this negotiation may be based on various factors that indicate which device is better suited to be the network controller. Such factors may include, but are not limited to, things such as: 1) which device has the functional capability to be a network controller, 2) whether a device is already operating as a network controller, and 3) whether a device is operating from battery power or an external power source.

FIG. 1 shows two wireless communication devices, according to an embodiment of the invention. Device 110 may include at least one radio 113, at least one processor 112, at least one memory 111, and at least one antenna 118, to facilitate wireless communications. In a similar manner, device 150 may include at least one radio 153, at least one processor 152, at least one memory 151, and at least one antenna 158 to facilitate wireless communications. Once discovering each other and establishing agreement on the necessary communication parameters, devices 110 and 150 may communicate wirelessly with each other. The various embodiments of the invention pertain to how the two devices may discover each other and/or agree on the necessary communication parameters.

Prior to establishing this communication, each device may be in one of several network conditions. In one condition, neither device is associated with any other wireless device. In another condition, one device may be unassociated while the other device may already be acting as a network controller for one or more other devices. In a third condition, one device may be associated as a subscriber station in a different network, but may be seeking new association with the other device. Other conditions may also be present.

In one embodiment, a first device (e.g., device 110) may transmit a discovery message in an attempt to discover any other devices that might be able and willing to communicate with it. A second device (e.g., device 150), may receive that discovery message and answer it by transmitting a response back to the first device. Within the scope of this document, a discovery message is a transmitted message whose purpose is to find a device with which to become associated. A second device, that wishes to become associated with the first device, may then transmit the response back to the first device. At least one of these transmissions may contain the information necessary to establish 1) whether both devices wish to associate with each other, 2) at least some of the communication parameters to be used, and 3) the information necessary to determine which device will assume the network controller role, if such an association is to take place.

Once the two devices have determined which will act as a network controller in their association, they may establish that association by completing an association exchange, which comprises the exchange of messages needed to activate the association between the two devices. In some embodiments, the association exchange may comprise one or more additional transmissions between the two devices after the response. These additional transmissions may have any suitable format. In other embodiments, the discovery message and response may contain sufficient information to complete the association.

Figure 2:
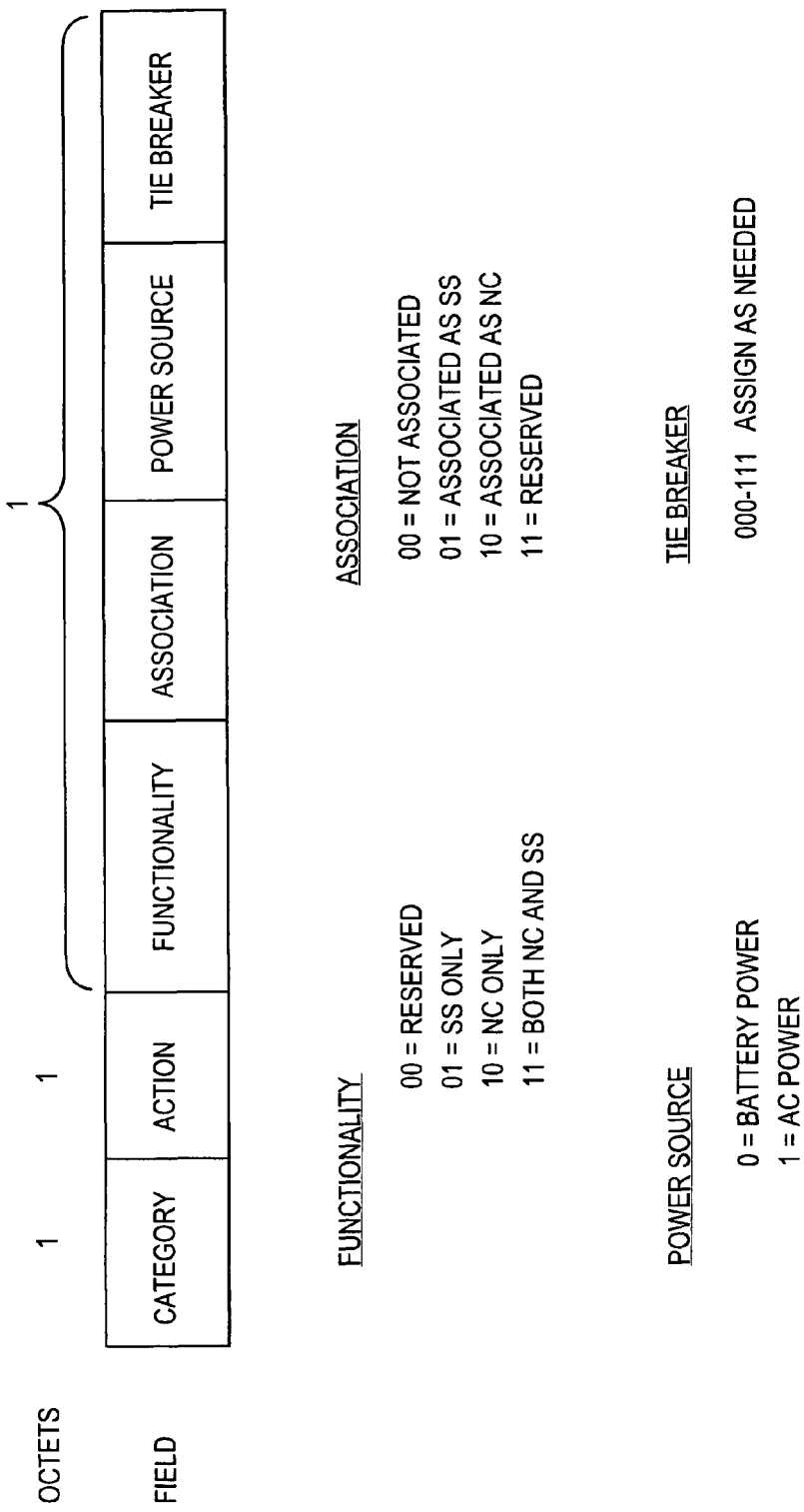
FIG. 2 shows a format for organizing information that indicates suitability to act as a network controller, according to an embodiment of the invention.

FIG. 2 shows a format for organizing information that indicates suitability to act as a network controller, according to an embodiment of the invention. When the two devices exchange information indicating their own suitability to act as a network controller, this information may be contained in both the discovery message and the response. The information in this exchange may be formatted in various ways. For example, the discovery message may be in the form of a probe request or an action frame, while the response may be in the form of a probe response or an action frame response. Other formats may also be used. And within that larger format, the information may be contained in various specific formats, such as in an Information Element (IE). FIG. 2 shows one possible format for an IE, but other formats are also possible and are considered to be within the scope of various embodiments of the invention.

In the illustrated embodiment, the first two fields of the IE are shown as the standard Category and Action fields, each 8 bits long, that are commonly used to indicate IE's. The remainder of the IE may contain the specific information exchanged by the two devices. In the embodiment shown, this information is packed into a single octet with specific bit assignments, but other embodiments may use other bit assignments, may include different formatting or field sizes, and/or may use more that one octet to contain the information. The same format may be used in the response as in the discovery message, or different formats may be used for each. In both cases, the information may describe the device transmitting that information.

In this specific example, the Functionality field describes whether the transmitting device has the functionality for (can operate as) a subscriber station but not a network controller, a network controller but not a subscriber station, or can operate as either one. In some embodiments, one or more values in this field may be undefined or reserved for future use. An undefined value may cause the process to be aborted, since the receiving device would not know how to interpret that field.

The Association field may describe the current association status of the transmitting device, such as: not associated with any other device, associated as a subscriber station, or associated as a network controller. In some embodiments (not shown), another value may indicate that the transmitting device is associated with more than one other device, which might require more bits in this field to describe the various possible combinations. The Power Source field may describe whether the transmitting device is operating on battery power, or from an AC power source. As previously described, various other types of information may be used as a tie-breaker in the event that the previously described information does not result in an obvious choice for which device should be the network controller.

Figure 3:
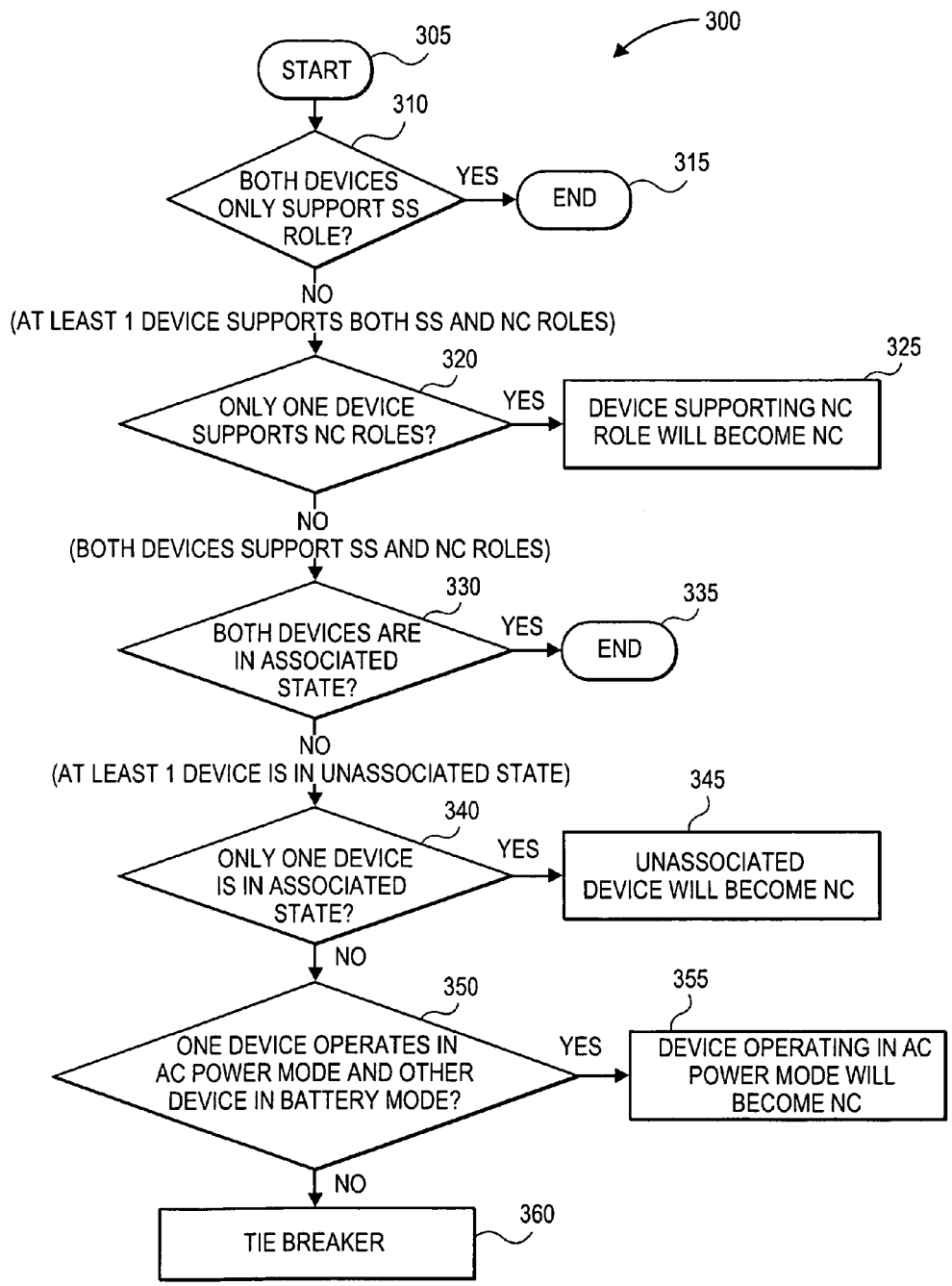
FIG. 3 shows a flow diagram of a method of determining a network controller, according to an embodiment of the invention.

FIG. 3 shows a flow diagram of a method of determining a network controller, according to an embodiment of the invention. This flow diagram is presented from the perspective of an observer of both devices, rather than from the perspective of only one of the devices. The processes that might be followed by a single device are described later.

In flow diagram 300, the process starts at 305. One of the first determinations to be made through the exchange of information is whether at least one of the devices includes the functionality of a network controller (NC). Some devices do not have the functionality to perform as an NC, but can only perform as a subscriber station (SS). It is assumed that if the device cannot perform as an NC, it has the functionality to perform as an SS, or it would not be engaged in this exchange. If neither device has NC functionality, as determined at 310, then the process may be aborted at 315, since these two devices won't be able to form an association with each other. If one, but only one, of the two devices has NC functionality, as determined at 320, then that device may become the NC as shown at 325.

Decision block 330 may be reached only if both devices are capable of assuming the NC role. In such a case, other determinations may be made. For example, if both devices are already associated as an SS in a network, as determined at 330, there is presumably no need for either of them to seek association with another device, and the process may be aborted at 335. However, this assumption may be overruled in some embodiments, if there is a reason for one or both devices to change its association.

At 340, if only one of the two devices is already in an associated state as an SS, and both are capable of performing as an NC, then the unassociated device may assume an NC role at 345. If neither device is in an associated state, and both are capable of performing as an NC, then at 350 their respective power sources may be considered. Since an NC may typically operate with no (or at least fewer) sleep periods than an SS, and typically transmits and receives more data than an SS, it should require more power to operate. So if one device operates from an AC power source, while the other operates from a battery, the device using AC power may become the NC at 355.

If both devices have the same type of power source, as determined 360 (either both are on AC power or both are on battery power), then another factor may be considered at 360 to break the tie. Several other factors might be considered, either as a stand alone factor or as one of a series of factors to be considered. For example, the device with the shortest (or longest) Timing Synchronization Function (TSF) might become the NC. Alternately, the device with the highest (or lowest) MAC address might become the NC. Even random numbers might be used as a tie breaker. Some of these tie breakers may indicate which device is better suited to perform as the NC, but others may not and may merely be a convenient means to break the tie.

Figure 4:
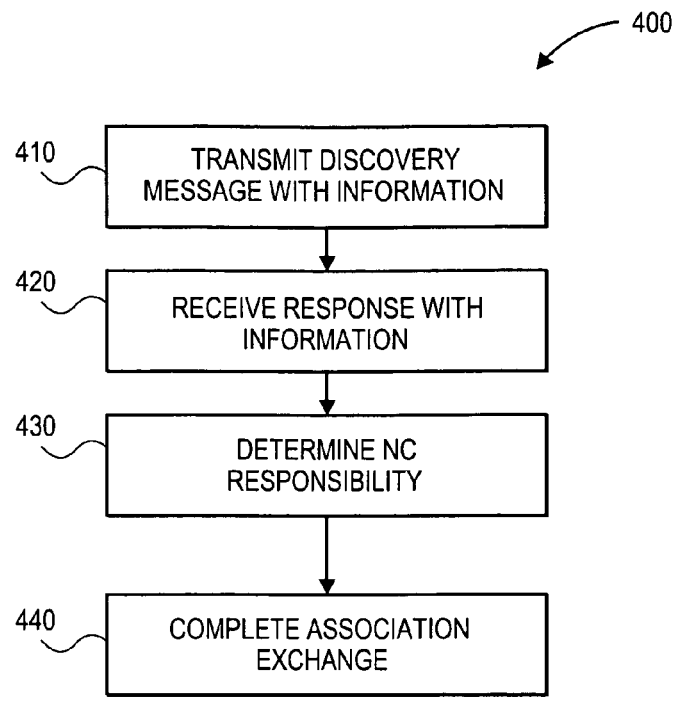
FIG. 4 shows a flow diagram of a method of determining a network controller by a first device, according to an embodiment of the invention.

FIG. 4 shows a flow diagram of a method of determining a network controller by a first device, according to an embodiment of the invention. This process is shown from the perspective of the wireless communications device initiating the exchange, referred to here as the initiating device. In flow diagram 400, at 410 the initiating device may transmit a discovery message containing, among other things, information about the initiating device's ability to perform as an NC. This discovery message may be in various formats, such as a probe request or an action frame. A device that received the discovery message and wishes to respond to it (referred to here as the responding device) may transmit a response back to the initiating device, which receives the response at 420. The response may be in various formats, such as a probe response or any other suitable format. This response may contain information about the responding device's ability to perform as an NC.

At this point, both the initiating device and the responding device have enough information to make a decision at 430 about which device will be the NC. In some embodiments, each device will make this determination separately, but since both are using the same criteria, they will both come to the same conclusion without the need to confirm their agreement. In other embodiments (not shown), a confirmation message may be sent between them to declare which device is to be the NC. At 440, with their NC/SS roles established, the initiating device may complete the association exchange with the responding device, resulting in the two device becoming associated with each other.

Figure 5:
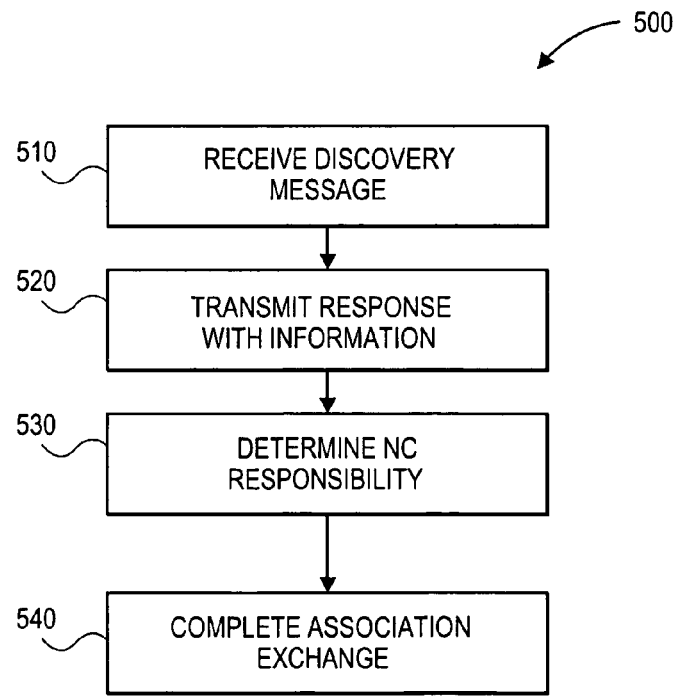
FIG. 5 shows a flow diagram of a method of determining a network controller by a second device, according to an embodiment of the invention.

FIG. 5 shows a flow diagram of a method of determining a network controller by a second device, according to an embodiment of the invention. This process is shown from the perspective of the responding device that interacts with the initiating device in FIG. 4. In flow diagram 500, at 510 a discovery message may be received by the responding device, the discovery message containing the information about the initiating device's ability to perform as an NC. This discovery message may be in various formats, such as a probe request or an action frame. At 520 the responding device may transmit a response back to the initiating device. This response may contain information about the responding device's ability to perform as an NC.

After the initiating device receives this response, both the initiating device and the responding device have enough information to make a decision at 530 about which device will be the NC. In some embodiments, each device will make this determination separately, but since both are using the same criteria, they will both come to the same conclusion without the need to confirm their agreement. In other embodiments (not shown), a confirmation message may be sent between them to declare which device is to be the NC. At 540, with their NC/SS roles established, the responding device may complete the association exchange with the initiating device, resulting in the two devices becoming associated with each other. It should be noted that with the scenario just described, either the initiating device or the responding device may become the NC, with the other device becoming the SS.

The foregoing description is intended to be illustrative and not limiting. Variations will occur to those of skill in the art. Those variations are intended to be included in the various embodiments of the invention, which are limited only by the scope of the following claims.

What is claimed is:

1. An apparatus, comprising an initiating wireless communications device having at least one radio and at least one processor, the initiating wireless communications device to:
   transmit a discovery message to find a responding wireless communications device to establish an association with the initiating wireless communication device, the discovery message comprising first information to indicate an ability of the initiating wireless communications device to operate as a network controller, the first information further indicating whether the initiating wireless communications device is currently associated with another device as a subscriber station or as a network controller, or not associated with another device, and whether the initiating wireless communications device is operating on battery power;
   receive a response to the discovery message from the responding wireless communications device, the response comprising second information to indicate an ability of the responding wireless communications device to operate as a network controller, the discovery message or response comprising tie-breaker information to break a tie when a network controller cannot be determined based upon the first information or the second information; and
   complete an association exchange to associate with the responding wireless communications device.

2. The apparatus of claim 1, the first information indicating whether the initiating wireless communications device includes network controller functionality.

3. The apparatus of claim 1, the discovery message comprising a probe request and the response comprising a probe response.

4. The apparatus of claim 1, the discovery message comprising an action frame.

5. The apparatus of claim 1, the initiating wireless communications device comprising at least one antenna.

6. The apparatus of claim 1, the discovery message comprising an information element comprising the first information.

7. The apparatus of claim 6, the information element comprising an association field comprising the first information indicating whether the initiating wireless communications device is currently associated with another device.

8. The apparatus of claim 1, the first information comprising an association field indicating whether the initiating wireless communications device is currently associated with more than one other device.

9. A method comprising operations performed by an initiating wireless communications device, the operations including:
   transmitting a discovery message to find a responding wireless communications device to establish an association with the initiating wireless communication device, the discovery message comprising first information to indicate an ability of the initiating wireless communications device to operate as a network controller, the first information further indicating whether the initiating wireless communications device is currently associated with another device as a subscriber station or as a network controller, or not associated with another device, and whether the initiating wireless communications device is operating on battery power;

receiving a response to the discovery message from the responding wireless communications device, the response comprising second information to indicate an ability of the responding wireless communications device to operate as a network controller, the discovery message or response comprising tie-breaker information to break a tie when a network controller cannot be determined based upon the first information or the second information; and completing an association exchange to associate with the responding wireless communications device.

10. The method of claim 9, the first information indicating whether the initiating wireless communications device includes network controller functionality.

11. The method of claim 9, the discovery message comprising a probe request and the response comprising a probe response.

12. The method of claim 9, the discovery message comprising an action frame.

13. The method of claim 9, the transmitting the discovery message comprising transmitting an information element containing the first information.

14. The method of claim 13, the information element comprising an association field comprising the first information indicating whether the initiating wireless communications device is currently associated with another device.

15. The method of claim 9, the first information indicating whether the initiating wireless communications device is currently associated with more than one other device.

16. An article of manufacture, comprising a non-transitory computer-readable storage medium that contains instructions, which when executed by one or more processors in an initiating wireless communications device result in performing operations comprising:

transmitting a discovery message to find a responding wireless communications device to establish an association with the initiating wireless communication, the discovery message comprising first information to indicate an ability of the initiating wireless communications device to operate as a network controller, the first information further indicating whether the initiating wireless communications device is currently associated with another device as a subscriber station or as a network controller, or not associated with another device, and whether the initiating wireless communications device is operating on battery power;

receiving a response to the discovery message from the responding wireless communications device, the response comprising second information to indicate an ability of the responding wireless communications device to operate as a network controller, the discovery message or response comprising tie-breaker information to break a tie when a network controller cannot be determined based upon the first information or the second information; and completing an association exchange to associate with the responding wireless communications device.

17. The article of claim 16, the first information further indicating
whether the initiating wireless communications device includes network controller functionality.

18. The article of claim 16, the discovery message is formatted as a probe request and the response is formatted as a probe response.

19. The article of claim 16, the discovery message is formatted as an action frame.

20. The article of claim 16, the operation of transmitting the discovery message comprising transmitting an information element containing the first information.

21. The article of claim 20, the information element comprising an association field indicating whether the initiating wireless communications device is currently associated with another device.

22. The article of claim 16, the first information indicating whether the initiating wireless communications device is currently associated with more than one other device.

* * * * *